(12) United States Patent
Weaver et al.

(10) Patent No.: US 8,808,773 B2
(45) Date of Patent: Aug. 19, 2014

(54) MICROBIAL REDUCTION IN A PROCESSING STREAM OF A MILLED PRODUCT

(76) Inventors: Glen Lester Weaver, Omaha, NE (US); Edith D. Akins-Lewenthal, Omaha, NE (US); Bradley T. Allen, Warsaw, MO (US); Scott R. Baker, Omaha, NE (US); Dean Hoerning, Omaha, NE (US); Anthony E. Petersen, Ashland, NE (US); Richard William Schumacher, Blair, NE (US); Benjamin Warren, Omaha, NE (US)

(*) Notice: Subject to any disclaimer, the term of this patent is extended or adjusted under 35 U.S.C. 154(b) by 765 days.

(21) Appl. No.: 13/010,398

(22) Filed: Jan. 20, 2011

(65) Prior Publication Data

US 2011/0177216 A1 Jul. 21, 2011

Related U.S. Application Data

(60) Provisional application No. 61/296,477, filed on Jan. 20, 2010.

(51) Int. Cl.
*A23B 9/04* (2006.01)
*A21D 6/00* (2006.01)
*A23B 7/01* (2006.01)
*A23L 3/00* (2006.01)

(52) U.S. Cl.
CPC . *A21D 6/005* (2013.01); *A23B 7/01* (2013.01); *A23L 3/003* (2013.01); *A23B 9/04* (2013.01)
USPC ........... 426/241; 423/237; 423/242; 423/463; 423/464; 423/465; 423/521; 423/523

(58) Field of Classification Search
USPC ......... 426/237, 241, 242, 463, 464, 465, 521, 426/523
See application file for complete search history.

(56) References Cited

U.S. PATENT DOCUMENTS

| | | | |
|---|---|---|---|
| 2,525,599 A | 10/1950 | Gustavson | 426/554 |
| 3,159,495 A | 12/1964 | Japikse | 426/601 |
| 3,368,904 A | 2/1968 | Young et al. | 426/463 |
| 3,428,461 A | 2/1969 | Hatton et al. | 426/555 |
| 3,490,917 A | 1/1970 | Doe et al. | 426/622 |

(Continued)

FOREIGN PATENT DOCUMENTS

| | | | | |
|---|---|---|---|---|
| EP | 0 512 259 | | 11/1992 | A23L 3/005 |
| EP | 0 552 006 A1 | | 7/1993 | A21D 6/00 |
| EP | 1 079 694 | | 11/1999 | A23B 9/02 |
| WO | 9738734 A1 | | 10/1997 | |

OTHER PUBLICATIONS

J. R. Warchalewski et al. "Influence of Microwave Heating on Biological Activities and Electrophoretic Pattern of Albumin Fraction of Wheat Grain", Cereal Chem. 87(1):35-41, published in 2010.

(Continued)

*Primary Examiner* — Drew Becker
*Assistant Examiner* — Preston Smith
(74) *Attorney, Agent, or Firm* — Ryan T. Grace; Advent, LLP

(57) ABSTRACT

A process for treating a milled product to reduce microbial activity at a high confidence level is disclosed. A sterile ready to eat milled product at a high confidence of sterility is also disclosed.

17 Claims, 3 Drawing Sheets

(56) References Cited

U.S. PATENT DOCUMENTS

| | | | |
|---|---|---|---|
| 3,554,772 A | 1/1971 | Haukinson | 426/331 |
| 3,585,047 A | 6/1971 | Galle | 426/46 |
| 3,730,728 A * | 5/1973 | Patashnik | 426/1 |
| 3,796,807 A | 3/1974 | Whelan | 426/468 |
| 3,869,558 A | 3/1975 | Hampton et al. | 426/443 |
| 3,974,298 A | 8/1976 | Cauvain et al. | 426/553 |
| 4,157,406 A | 6/1979 | Hanamoto et al. | 426/622 |
| 4,259,362 A | 3/1981 | Hanamoto et al. | 425/362 |
| 4,478,857 A | 10/1984 | Stauss | 426/72 |
| 4,937,087 A | 6/1990 | Bush et al. | 426/465 |
| 5,107,097 A * | 4/1992 | Negandhi et al. | 219/400 |
| 5,352,473 A | 10/1994 | Chiqurupati et al. | 426/549 |
| 5,433,966 A | 7/1995 | Wolt et al. | 426/549 |
| 5,753,291 A * | 5/1998 | Pederson et al. | 426/441 |
| 5,789,012 A | 8/1998 | Slimak | 426/629 |
| 6,406,727 B1 * | 6/2002 | Hamid-Samimi et al. | 426/241 |
| 6,534,105 B2 * | 3/2003 | Kartchner | 426/241 |
| 6,784,405 B2 | 8/2004 | Flugstad et al. | 219/497 |
| 7,067,822 B2 | 6/2006 | Lyons et al. | 250/435 |
| 2006/0013927 A1 | 1/2006 | Geveke et al. | 426/237 |
| 2006/0013932 A1 | 1/2006 | Ljungstrom | 426/521 |
| 2007/0212472 A1 | 9/2007 | Holenstein et al. | 426/634 |
| 2010/0092639 A1 | 4/2010 | Upreti et al. | 426/549 |

OTHER PUBLICATIONS

International Search Report and Written Opinion mailed Oct. 18, 2011, in PCT/US2011/021896.

* cited by examiner

MICROBIAL REDUCTION IN A PROCESSING STREAM OF A MILLED PRODUCT

RELATED APPLICATIONS

The present application claims the benefit under 35 U.S.C. §119(e) of U.S. Provisional Application Ser. No. 61/296,477 filed Jan. 20, 2010, entitled MICROBIAL REDUCTION IN A PROCESSING STREAM OF MILLED PRODUCTS. This application is filed concurrently with U.S. patent application Ser. No. 13/010,436 filed Jan. 20, 2011 entitled TRANSPORT SCHEDULING FOR LOW MICROBIAL BULK PRODUCTS, U.S. patent application Ser. No. 13/010,458 filed Jan. 20, 2011 entitled TRANSPORT SCHEDULING FOR LOW MICROBIAL BULK PRODUCTS, U.S. patent application Ser. No. 13/010,480 filed Jan. 20, 2011 entitled TRANSPORT SCHEDULING FOR LOW MICROBIAL BULK PRODUCTS, U.S. patent application Ser. No. 13/010,511 filed Jan. 20, 2011 entitled TRANSPORT SCHEDULING FOR LOW MICROBIAL BULK PRODUCTS, PCT International Application No. PCT/US2011/021896 filed Jan. 20, 2011 entitled MICROBIAL REDUCTION IN A PROCESSING STREAM OF MILLED PRODUCTS, and PCT International Application No. PCT/US2011/021898 filed Jan. 20, 2011 entitled TRANSPORT SCHEDULING FOR LOW MICROBIAL BULK PRODUCTS. The above mention applications are incorporated herein in their entirety.

BACKGROUND

Milled products can be used in a variety of consumer cooking applications. Milled products can also be utilized by food companies as an ingredient to produce a consumer food product. Many times the milled product is cooked prior to consumption. However in many situations a consumer can consume the milled product raw (e.g. raw cookie dough, raw cake batter, raw flour, raw grains and the like). As an end product, raw milled products can have health risks to consumers. These health risks can stem from uncertainty in confidence levels in the reduction of microbial activity in the raw milled products.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure pertain to a process for treating a milled product to reduce microbial activity at a high confidence level. Aspects of the disclosure further pertain to a sterile milled product at a high confidence of sterility that is ready-to-eat.

DRAWINGS

DETAILED DESCRIPTION

Figure 1:
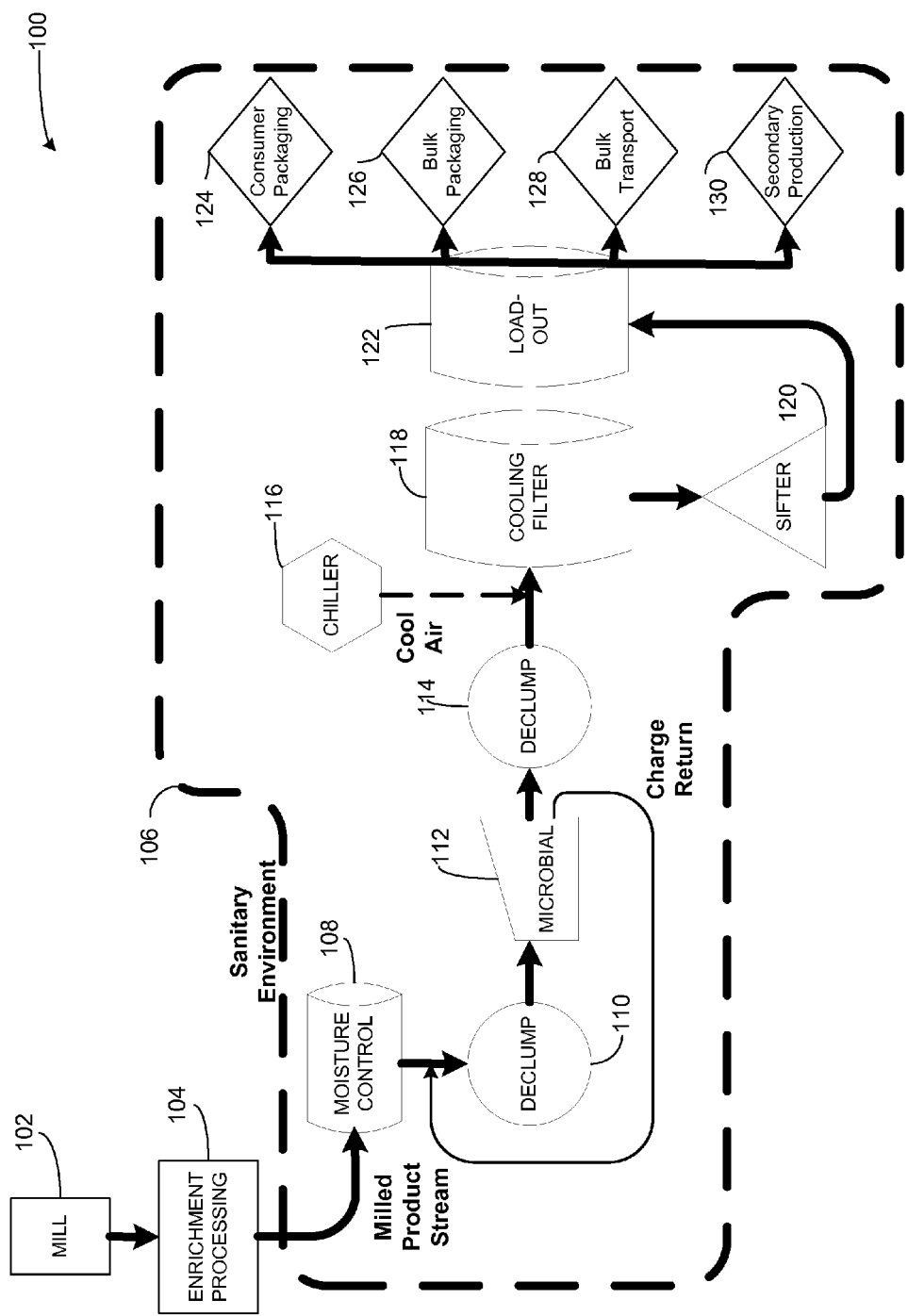
FIG. 1 is an exemplary system diagram illustrating an exemplary system for microbial reduction in a processing stream of a milled product.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be embodied as methods, processes and/or devices. The following detailed description is, therefore, not to be taken in a limiting sense.

Milled products can be produced from a variety of raw materials. The disclosure herein utilizes several examples associated with flour. Yet, this disclosure is not limited to such a product. Milled products can include, for example, flour of all types, bran, germ, grains, oats, wheat, rye, barley and the like. It is further contemplated that milled products that utilize the processes herein can include various ingredient types, sugars, spices and such. It is also contemplated that milled products that utilize the processes herein can include products that are first dehydrated and then milled or ground such as peppers, vegetables, fruits and the like.

Milled products have a plurality of uses in the cooking industry. As an example associated with flour, flour can be utilized by a consumer for baking on a micro level. In such a situation, relatively small packages of flour can be obtained by the consumer for baking. For example, a consumer can purchase a small package of flour for baking a small batch of cookies at home. Flour can also be utilized by large food companies as an ingredient in an end product. In such a situation, large quantities of flour can be required for normal activities of the food company. For example, a food company can purchase thousands of pounds of flour to produce large quantities of cookie dough that an end consumer would ultimately bake. Many times the milled product is ultimately cooked prior to consumption. For example, a consumer can bake the cookie dough prior to consuming a baked cookie. However, in many situations a consumer may consume the milled product in a raw form. For example, a consumer may consume cookie dough in a raw form prior to cooking the dough. Such consumption of raw milled products can have health risks to consumers because of microbial activity in the raw milled product. These health risks can stem from uncertainty in microbial reduction when the milled product is processed.

Aspects of the disclosure herein pertain to microbial reduction in a processing stream of a milled product. In one aspect, the stream of milled product is a flowable stream of granules of the milled product. As more fully set forth below, the process is substantially continuous. A stream of a milled product can be introduced into a sanitary environment. For example, the sanitary environment can be a conveyance network of belts. In other aspects, the conveyance network can include a closed duct network having forced sanitary air for transporting the milled product through the process. The stream of milled product is conveyed to a moisture control device to, for example, hydrate the stream. The moisture control device can standardize the moisture content throughout the stream. Also, moisture control can occur at a mill and/or just prior to conveyance through a microbial reduction device. The stream is then conveyed to the microbial reduction device where the stream is conveyed through the microbial reduction device to ensure appropriate microbial levels without substantially denaturing and/or substantially affecting the functionality of the milled product in the stream. The time and the temperature of the microbial reduction device are at least partially determined based on the moisture content of the hydrated stream of the product. The product is subsequently conveyed via the duct network to down stream processes and storage via chilled forced air. Such cooling can minimize condensation formation throughout the system. At a load-out stage, the milled product can be prepared for consumer packaging, bulk packaging, bulk vehicular transport via a holding tank, and/or conveyance to secondary production facilities.

Aspects further pertain to a sterile milled product that is ready to eat. The sterility includes a high confidence level. The sterile milled products can be packaged for consumer use. For example, the milled product can be packaged in consumer quantities such as 1 pound to 20 pound bags or the like. In other aspects, the milled product is not packaged. For example, the process described herein can include a conduit or conveyance network to provide a flow channel for a milled product stream to a secondary processing or food manufacturing facility. In still other aspects, the milled product can be transported in bulk. For example, the product stream can be conveyed into a freight shipping container or vessel. Several aspects for shipping milled products in bulk form are disclosed in U.S. Provisional Application Ser. No. 61/354,962 filed Jun. 15, 2010 and titled TRANSPORT SCHEDULING FOR LOW MICROBIAL BULK PRODUCTS.

A. System

FIG. 1 represents one exemplary system 100 for microbial reduction in a processing stream of a milled product. System 100 represents a system overview. System 100 can include various configurations without departing from the functionality set forth in this description. The elements depicted in FIG. 1 and functionality described can be integrated into the processing stream as single elements and/or combination elements that include multiple functionalities. For example, in FIG. 1, various elements and arrows between elements are depicted for purposes of explaining aspects of functionality and not necessarily for indicating where the elements structurally "reside" or that the elements are single entities within the flow. It is contemplated that the elements can include combination devices performing multiple functions and/or a single device performing a single function. It is further contemplated that the elements indicated in FIG. 1 can be located in a myriad of facility locations depending on desire, processing efficiencies, economics, etc. The depiction in FIG. 1 of the categorized and named elements is merely for facilitating a logical flow of the description of system 100 as set forth herein.

As indicated in FIG. 1, system 100 can, optionally, include mill 102 for performing milling operations on a product. The product can also be received from storage, a third party, other processes, and the like. As indicated above, the milled product can include, for example, flour of all types, bran, germ, grains, oats, wheat, rye, barley and the like. It is further contemplated that milled products that utilize the processes herein can include various ingredient types, sugars, spices and such. It is also contemplated that milled products that utilize the processes herein can include products that are first dehydrated and then milled or ground such as peppers, vegetables, fruits and the like. From mill 102, the milled product can be conveyed to enrichment processing device(s) 104 for enriching the milled product with vitamins, proteins, nutraceuticals, minerals and such. In other aspects, moisture control as indicated below, can occur at mill 102.

Figure 3:
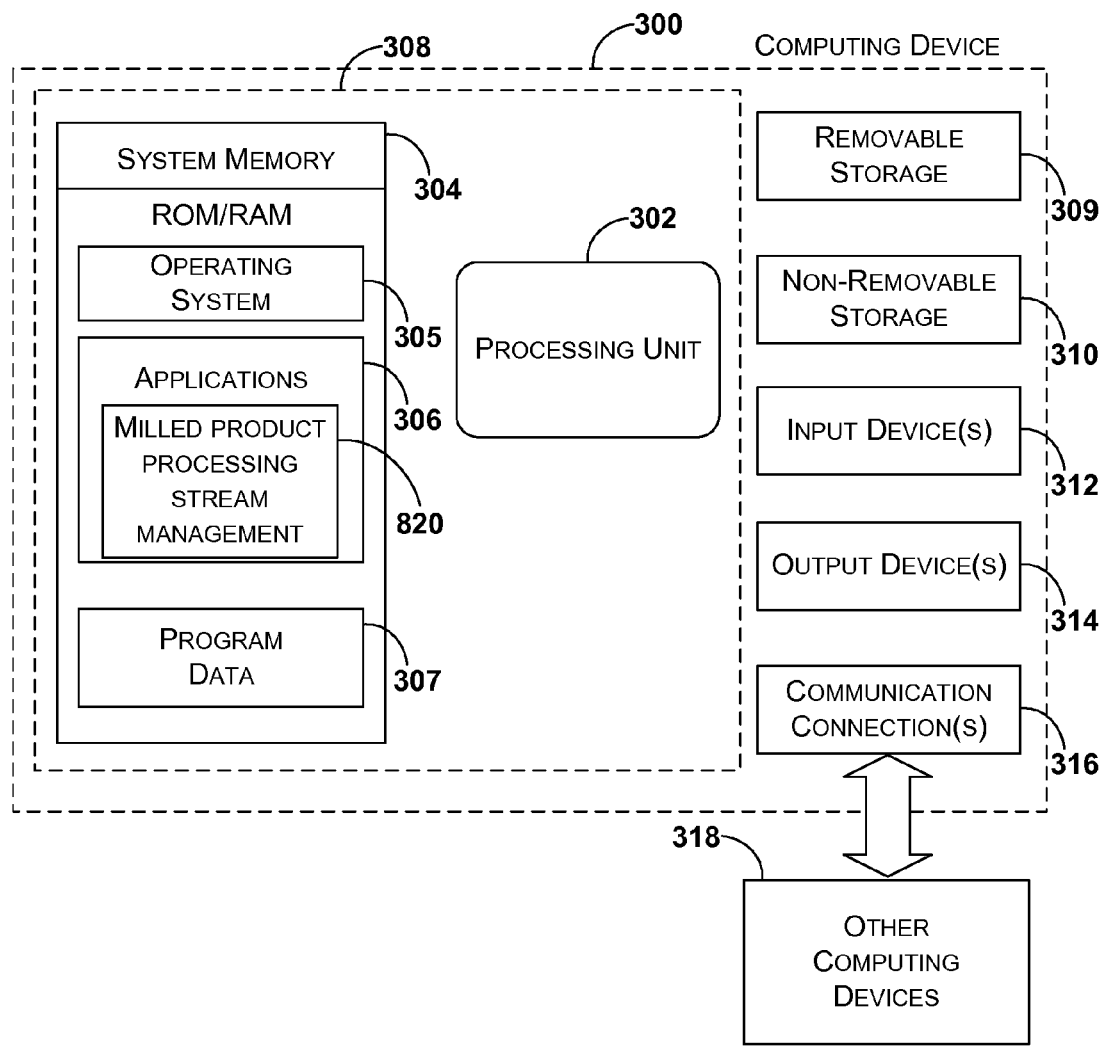
FIG. 3 is an exemplary computing system that can be utilized in various aspects for microbial reduction in a processing stream of a milled product.

From enrichment processing device(s) 104, a milled product stream can flow into sanitary environment 106. In one example, the milled product stream can be described as a flowable stream of product granules capable of being transported by forced air. Yet, the ability to be transported by forced air does not mean that the product must be transported by forced air. Sanitary environment 106 can include various configurations and forms. For example, sanitary environment 106 can include a network of ducts for transporting the milled product via forced sanitary air flow between elements of system 100. As another example, sanitary environment 106 can include a clean room that encompasses the indicated elements of system 100. Sanitary environment 106 can be utilized in several configurations within the production line. For example, even though the "beginning" of the sanitary environment 106 is indicated after the flow from enrichment processing device(s) 104, the "beginning" of sanitary environment 106 can commence when the milled product stream enters microbial reduction device 112 or when the milled product exits microbial reduction device 112. Sanitary environment 106 can also include sanitary breaking functionality. For example, a closed duct network can be cleared by forced sanitary air and/or heated to inactive microorganisms. The heating of the closed duct network can occur via heated air forced through the system and/or a network of heating coils associated with the ducts to heat the system to a point of inactivating microorganisms. Sanitary environment 106 can be further automated with one or more computer devices. An exemplary computing device is indicated below in FIG. 3. The computing device can be an individual computing device specific to sanitary environment 106. In other situations, the computer device can be a networked computing device in communication and coordinating several actions/events for the elements of FIG. 1. For example, the computing device can be configured to send control signals to heating elements, chilling elements, forced air systems, etc. The computing device can be further configured to implement scheduling of operations of the system, flow rate operations and the like. Such operations can include activation times, sanitary break times and flow rate sensing within the ducts, flow rate control within the ducts and other processes.

From enrichment processing device 104, the milled product stream can be conveyed to moisture control device 108 that can be located in sanitary environment 106. Moisture control device 108 can include a chamber for continuously transporting the milled product stream through the same. Moisture control device 108 can also include processing functionality and/or controls for receiving a target moisture content of the milled product, sensing current moisture content of the milled product and for calculating a water flow rate for hydrating the milled product to the target moisture content. In one aspect, the water is sprayed or dripped onto the milled product. In other aspects, the water flow can be distinguished from a steaming application. In one aspect, the moisture control device includes a moisture sensor for sensing the current moisture of the milled product and a hydration implement for subjecting the milled product to moisture. Even though moisture control device 108 is described herein as having hydration functionality, it is contemplated that for certain application needs of the milled product, the moisture control device 108 can dehydrate the milled product. The purpose of moisture control device 108 is to help ensure that the moisture content of the milled product is generally uniform throughout the stream in the conveyance system. The importance of such is more fully set forth below.

Moisture control device 108 can be further automated with one or more computer devices. An exemplary computing device is indicated below in FIG. 3. The computing device can be an individual computing device specific to moisture control device 108. In other situations, the computer device can be a networked computing device in communication and coordinating several actions/events for the elements of FIG. 1. For example, the computing device can be configured to receive a target moisture content, receive an actual moisture content from a network sensor, and calculate a water quantity to provide hydration. The computer device can be further configured to send control signals to networked elements of FIG. 1 to cause automation of several processes. For example, the computer device can further receive target temperatures from microbial reduction device 112, target times from microbial reduction device 112, and/or processing rates from microbial reduction device 112. The computer device can be configured to calculate optimal moisture contents, optimal processing temperatures, and/or optimal processing times based on any of the factors. The computing device can be further configured to control the elements of FIG. 1 in accordance with the calculations.

Generally, the milled product can enter moisture control device 108 having a moisture content of about 13% to about 14.5%. Generally, the moisture content is not consistent throughout the stream because of moisture differences in the grain and differences in storage conditions prior to milling. The moisture content of the milled product when it enters moisture control device 108 can also vary from the above ranges depending on the prior processing events. For example, portions of the milled product stream can enter moisture control device 108 having a moisture content of about 4%, 5%, 6%, 7%, 8%, 9%, 10%, 11%, 12%, 13%, 14%, 15%, 16%, 17%, 18%, 19%, 20% to about 4%, 5%, 6%, 7%, 8%, 9%, 10%, 11%, 12%, 13%, 14%, 15%, 16%, 17%, 18%, 19%, and 20%.

In one aspect, moisture control device 108 can standardize the milled product stream to a target moisture content throughout the stream. For example, the target moisture content throughout the stream can be from about 12% to about 16%. In other aspects, the target moisture content throughout the stream can be from about 12.5% to about 14.5%. In still other aspects, the target moisture content can be about 13.5%. Yet, it is contemplated that moisture control device 108 can hydrate/dehydrate the milled product stream to a moisture content of about 4%, 5%, 6%, 7%, 8%, 9%, 10%, 11%, 12%, 13%, 14%, 15%, 16%, 17%, 18%, 19%, 20% to about 4%, 5%, 6%, 7%, 8%, 9%, 10%, 11%, 12%, 13%, 14%, 15%, 16%, 17%, 18%, 19%, and 20%. Moisture control device 108 can hydrate/dehydrate the milled product stream to a moisture content at or below 20%. Moisture control device 108 can hydrate/dehydrate the milled product stream to a moisture content at or above 4%. Moreover, the moisture control device 108 can change the moisture content of the milled product stream by about 0.5%, 1%, 1.5%, 2%, 2.5%, 3%, 3.5%, 4%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0% to about 0.5%, 1%, 1.5%, 2%, 2.5%, 3%, 3.5%, 4% 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0%. The moisture content of the milled product stream can have a moisture consistency throughout the stream. For example, the moisture content can deviate from the target moisture content less than about 0.5% throughout the stream. In other aspects, the moisture content can deviate less than about 0.2% throughout the stream.

In the situation where moisture control device 108 hydrates the milled product, the milled product stream can flow to declumping device 110. Declumping device 110 can remove any clumps within the milled product to provide a substantially uniform milled product flow into microbial reduction device 112. For example, declumping device 110 can be a feed hopper with a vibrating unit or the like. In other situations, the milled product stream may not require declumping and therefore declumping device 110 may not be in system 100 prior to microbial treatment device 112.

Milled product flow enters microbial reduction device 112. Microbial reduction device 112 can include a radio frequency ("RF") device. In one aspect, the RF device operates in a range of about 20 MHz to about 2450 MHz. In another aspect, the RF device is a microwave operating in a range of 915 MHz to about 2450 MHz. In still other aspects, the RF device can operate at about 40 MHz. One example of an RF device operating at about 40 MHz is a Macrowave™ OmniTerm™ Simulator produced by Radio Frequency Company, Inc. located in Mills, Mass. Microbial reduction device 112 can include a process of causing a RF generator to create an alternating electric field between two electrodes. The milled product stream is conveyed between the electrodes where the alternating energy causes polar molecules in the milled product stream to continuously reorient to face opposite poles. The friction resulting from the molecular movement causes the milled product stream to rapidly heat throughout the entire mass of the milled product stream.

Microbial reduction device 112 can be enclosed in a clean area and transport the milled product stream by belt conveyance. In other aspects, microbial reduction device 112 is in communication with the duct conveyance network described herein and processes the milled product within the duct network as the milled product stream flows through the duct. Microbial reduction device 112 can be further automated with one or more computer devices. An exemplary computing device is indicated below in FIG. 3. The computing device can be an individual computing device specific to microbial reduction device 112. In other situations, the computer device can be a networked computing device in communication and coordinating several actions/events for the elements of FIG. 1. For example, the computing device can be configured to receive target processing times, target temperatures, target flow rates, target scheduling and the like. The computer device can be configured to calculate optimal moisture contents, optimal processing temperatures, and/or optimal processing times based on any of the factors. The computer device can be further configured to send control signals to control the operations of one or more of the elements in FIG. 1 based on the calculations.

The milled product can enter microbial reduction device 112 at a moisture content similar to the moisture content within existing moisture control device 108. Microbial reduction device 112 can process the milled product stream to a temperature from about 150° F. to about 240° F. In other aspects, microbial reduction device 112 can process the milled product stream to a temperature from about 170° F. to about 210° F. In still other aspects, microbial reduction device 112 can process the milled product stream to a temperature from about 180° F. to about 200° F. In yet other aspects, microbial reduction device 112 can process the milled product stream to a temperature of about 190° F. The microbial reduction device 112 can process the milled product stream to a temperature of about 150° F., 151° F., 152° F., 153° F., 154° F., 155° F., 156° F., 157° F., 158° F., 159° F., 160° F., 161° F., 162° F., 163° F., 164° F., 165° F., 166° F., 167° F., 168° F., 169° F., 170° F., 171° F., 172° F., 173° F., 174° F., 175° F., 176° F., 177° F., 178° F., 179° F., 180° F., 181° F., 182° F., 183° F., 184° F., 185° F., 186° F., 187° F., 188° F., 189° F., 190° F., 191° F., 192° F., 193° F., 194° F., 195° F., 196° F., 197° F., 198° F., 199° F., 200° F., 201° F., 202° F., 203° F., 204° F., 205° F., 206° F., 207° F., 208° F., 209° F., 210° F., 211° F., 212° F., 213° F., 214° F., 215° F., 216° F., 217° F., 218° F., 219° F., 220° F., 221° F., 222° F., 223° F., 224° F., 225° F., 226° F., 227° F., 228° F., 229° F., 230° F., 231° F., 232° F., 233° F., 234° F., 235° F., 236° F., 237° F., 238° F., 239° F., 240° F., to about 150° F., 151° F., 152° F., 153° F., 154° F., 155° F., 156° F., 157° F., 158° F., 159° F., 160° F., 161° F., 162° F., 163° F., 164° F., 165° F., 166° F., 167° F., 168° F., 169° F., 170° F., 171° F., 172° F., 173° F., 174° F., 175° F., 176° F., 177° F., 178° F., 179° F., 180° F., 181° F., 182° F., 183° F., 184° F., 185° F., 186° F., 187° F., 188° F., 189° F., 190° F., 191° F., 192° F., 193° F., 194° F., 195° F., 196° F., 197° F., 198° F., 199° F., 200° F., 201° F., 202° F., 203° F., 204° F., 205° F., 206° F., 207° F., 208° F., 209° F., 210° F., 211° F., 212° F., 213° F., 214° F., 215° F., 216° F., 217° F., 218° F., 219° F., 220° F., 221° F., 222° F., 223° F., 224° F., 225° F., 226° F., 227° F., 228° F., 229° F., 230° F., 231° F., 232° F., 233° F., 234° F., 235° F., 236° F., 237° F., 238° F., 239° F., 240° F. The microbial reduction device 112 can process the milled product stream at a temperature of at or below 240° F. The microbial reduction device 112 can process the milled product stream at a temperature of at or above 150° F. The temperature will depend at least in part on the starting moisture content of the milled product stream and the desired level of microbial reduction.

The resident time within microbial reduction device 112 can be about 1.0 minutes to about 10.0 minutes. In other aspects, the resident time within microbial reduction device 112 can be about 5 minutes. The resident time within microbial reduction device 112 can be about 1.0 minutes, 1.5 minutes, 2.0 minutes, 2.5 minutes, 3.0 minutes, 3.5 minutes, 4.0 minutes, 4.5 minutes, 5.0 minutes, 5.5 minutes, 6.0 minutes, 6.5 minutes, 7.0 minutes, 7.5 minutes, 8.0 minutes, 8.5 minutes, 9.0 minutes, 9.5 minutes, 10.0 minutes to about 1.0 minutes, 1.5 minutes, 2.0 minutes, 2.5 minutes, 3.0 minutes, 3.5 minutes, 4.0 minutes, 4.5 minutes, 5.0 minutes, 5.5 minutes, 6.0 minutes, 6.5 minutes, 7.0 minutes, 7.5 minutes, 8.0 minutes, 8.5 minutes, 9.0 minutes, 9.5 minutes, 10.0 minutes. The resident time within the microbial reduction device 112 can be at or above 1.0 minutes. The resident time within microbial reduction device 112 can be at or below 10.0 minutes. The resident time will depend at least in part on the starting moisture content of the milled product stream, and the desired level of microbial reduction.

In one aspect, the microbial reduction device 112 causes the milled product stream to exit the microbial reduction device 112 with a confidence level in the reduction of any microbial levels; yet, produce a product with substantially maintained product functionality (little to no denaturation). For example, the percentage of the milled product stream that is denatured by microbial reduction device 112 can be about 5%, 6%, 7%, 8%, 9%, 10% to about 5%, 6%, 7%, 8%, 9%, 10%. As another example, example, the percentage of the milled product stream that is denatured can be about 1%, 2%, 3%, 4%, 5%, 6%, 7%, 8%, 9%, 10%, 11%, 12%, 13%, 14%, 15%, 16%, 17%, 18%, 19%, 20% to about 1%, 2%, 3%, 4%, 5%, 6%, 7%, 8%, 9%, 10%, 11%, 12%, 13%, 14%, 15%, 16%, 17%, 18%, 19%, 20%.

In one aspect, a milled product stream exits the microbial reduction device 112 with about a 3.0 log CFU/g reduction in any microorganisms to an undetectable microorganism level. The reduction in any microorganism levels can be about 3.0 log CFU/g, 3.2 log CFU/g, 3.4 log CFU/g, 3.6 log CFU/g, 3.8 log CFU/g, 4.0 log CFU/g, 4.2 log CFU/g, 4.4 log CFU/g, 4.6 log CFU/g, 4.8 log CFU/g, 5.0 log CFU/g, 5.2 log CFU/g, 5.4 log CFU/g, 5.6 log CFU/g, 5.8 log CFU/g, 6.0 log CFU/g, 6.2 log CFU/g, 6.4 log CFU/g, 6.6 log CFU/g, 6.8 log CFU/g, 7.0 log CFU/g to about 3.0 log CFU/g, 3.2 log CFU/g, 3.4 log CFU/g, 3.6 log CFU/g, 3.8 log CFU/g, 4.0 log CFU/g, 4.2 log CFU/g, 4.4 log CFU/g, 4.6 log CFU/g, 4.8 log CFU/g, 5.0 log CFU/g, 5.2 log CFU/g, 5.4 log CFU/g, 5.6 log CFU/g, 5.8 log CFU/g, 6.0 log CFU/g, 6.2 log CFU/g, 6.4 log CFU/g, 6.6 log CFU/g, 6.8 log CFU/g, 7.0 log CFU/g. The reduction in any microorganism levels can be greater than 3.0 log CFU/g. The reduction in any microorganism levels can be greater than 4.0 log CFU/g. The reduction in any microorganism levels can be greater than 5.0 log CFU/g. The reduction in any microorganism levels can be greater than 6.0 log CFU/g.

From microbial reduction device 112, a portion of the milled product stream can return to prior elements of system 100. Also, in other aspects, the milled product can return to prior elements of system 100 from declumping device 114. The charge return can be desired where the portion of the milled product stream is an initial portion of the product stream when system 100 is activated. The milled product stream can further continue to declumping device 114 to remove any clumps within the milled product to provide a substantially uniform milled product flow. For example, declumping device 114 can be a feed hopper with a vibrating unit or the like. In other situations the milled product stream may not require declumping and therefore declumping device 114 would not be in system 100.

From declumping device 114, an optional chiller can communicate inline with the conveyance network. For example, chiller 116 can utilize sanitary air and chill the air of the duct network. Even though chiller 116 is indicated as engaging system 100 downstream of declumping device 114, chiller 116 can engage system 100 downstream of microbial reduction device 112 as well. As stated, chiller 116 can force cool air into the conveyance network to convey the milled product stream. During conveyance and during subsequent operations indicated by system 100, the forced air from the chiller can return the milled product stream to a temperature of about 70° F. to about 230° F. In other aspects, the forced air from the chiller can return the milled product stream to about ambient temperature. During conveyance and during subsequent operations indicated by system 100, the forced air from the chiller can return the milled product stream to a temperature of about 70° F., 75° F., 80° F., 85° F., 90° F., 95° F., 100° F., 105° F., 110° F., 115° F., 120° F., 125° F., 130° F., 135° F., 140° F., 145° F., 150° F., 155° F., 160° F., 165° F., 170° F., 175° F., 180° F. to about 70° F., 75° F., 80° F., 85° F., 90° F., 95° F., 100° F., 105° F., 110° F., 115° F., 120° F., 125° F., 130° F., 135° F., 140° F., 145° F., 150° F., 155° F., 160° F., 165° F., 170° F., 175° F., 180° F., 185° F., 190° F., 195° F., 200° F., 205° F., 210° F., 215° F., 220° F., 225° F., 230° F. The temperature can include values outside of the given ranges depending on ambient conditions and the desired end product. As stated above, the temperature reduction minimizes the formation of condensation throughout the system, which can be a condition that facilitates microbial growth.

Optionally, the milled product stream can be conveyed to cooling and filtration device 118 for further cooling and filtration. Also, the milled product stream can, optionally, be further conveyed to sifter 120 for verifying the particulate size of the milled product stream.

The milled product stream can be conveyed to a load-out device 122. Load-out device 122 can include a holding vessel, a valve, and/or conveyance outlet for purposes of facilitating the transport and/or output of the milled product. For example, load-out device 122 can hold the milled product to facilitate the conveyance of the milled product to a consumer packaging operation 124. Consumer packaging operation 124 can include conveying the milled product to one or more secondary holding vessels which facilitate the injection of the milled product into consumer sized bags. As another example, load-out device 122 can hold the milled product to facilitate the conveyance of the milled product to a bulk packaging operation 126. Bulk packaging operation 126 can include conveying the milled product to one or more secondary holding vessels which facilitate the injection of the milled product into bulk sized bags. As still another example, load-out device 122 can hold the milled product to facilitate the conveyance of the milled product to a bulk transport operation 128. The milled product can be released from load-out device 122 into a sanitary truck compartment, a sanitary train compartment or the like. The transport of a milled product is more fully described in U.S. Provisional Application Ser. No. 61/354,962 filed Jun. 15, 2010 and titled TRANSPORT SCHEDULING FOR LOW MICROBIAL BULK PRODUCTS. As yet another example, load-out device 122 can hold the milled product to facilitate the conveyance of the milled product to a secondary production site 130. The milled product can be transported via the conveyance network to a food production site for making foods in large quantities.

B. Methods and Processes

Figure 2:
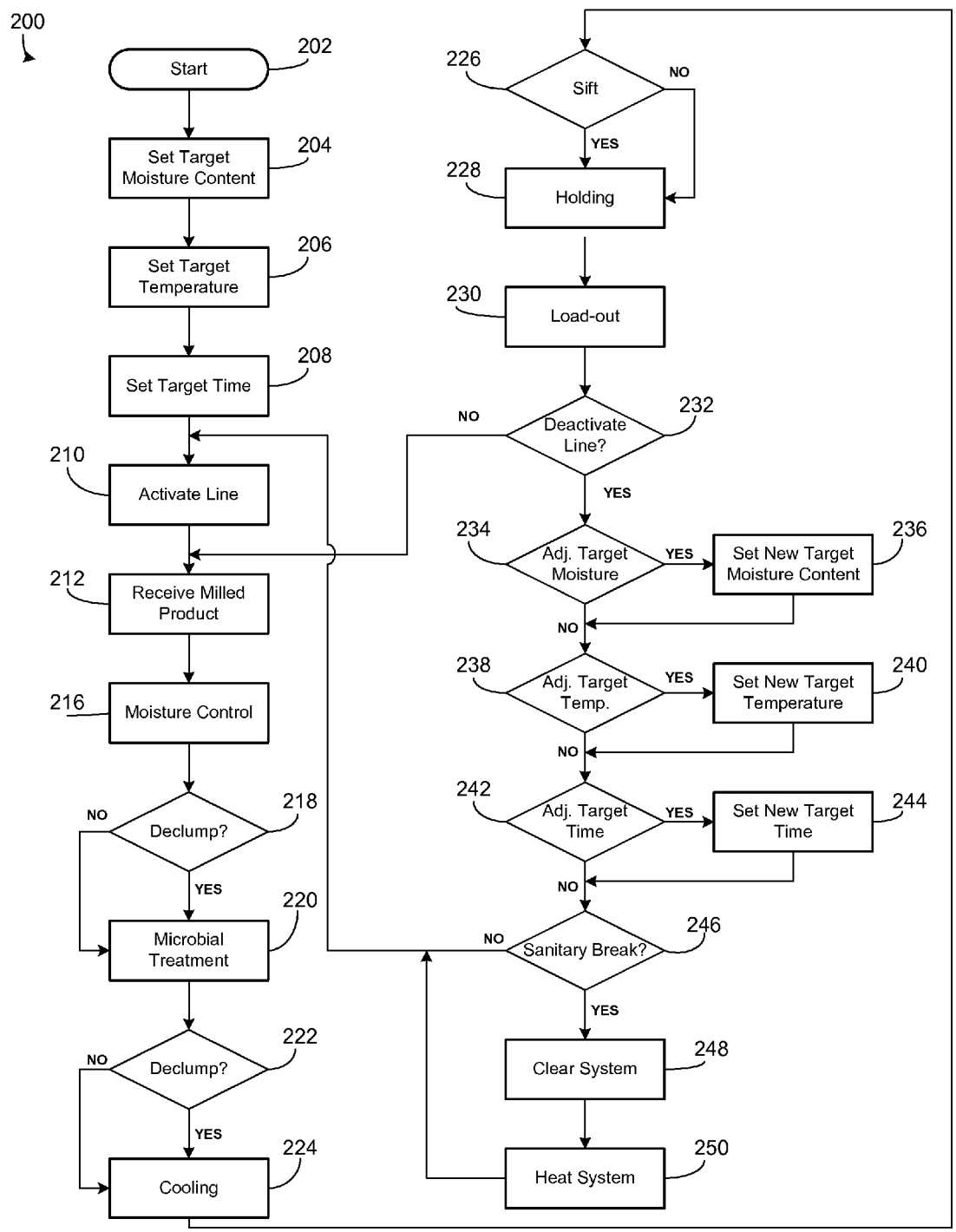
FIG. 2 is an exemplary operational flow diagram illustrating an exemplary process for microbial reduction in a processing stream of a milled product.

FIG. 2 is an exemplary operational flow diagram illustrating an exemplary process for microbial reduction in a processing stream of a milled product. Operational flow 200 begins at start operation 202 and continues to operation 204 where a target moisture content for the milled product stream is determined and set in the system. Target moisture contents for the milled product stream are more fully set forth above. In one aspect, the target moisture content is set on a computing device, such as the computing device indicated in FIG. 3. In another aspect, the target moisture content can be set on moisture control device 108 and/or microbial reduction device 112. The target moisture content can be manually set by an operator and/or the target moisture content can be automatically set, via computer instructions, in response to a schedule and/or in response to a determined variable or value.

Operational flow 200 continues to operation 206 where a target temperature for the milled product stream is determined and set in the system. Target temperatures for the milled product stream are more fully set forth above. In one aspect, the target temperature is set on a computing device, such as the computing device indicated in FIG. 3. In another aspect, the target temperature can be set on microbial reduction device 112. The target temperature can be manually set by an operator and/or the target temperature can be automatically set, via computer instructions, in response to a schedule, event and/or in response to a determined variable. In still other aspects, the computing device receives the target moisture content for the milled product stream and then calculates a corresponding temperature.

From operation 206, operational flow 200 continues to operation 208 where a target residence time for microbial reduction device 112 is determined and/or set in the system. Target times for the milled product stream are more fully set forth above. In one aspect, the target time is set on a computing device, such as the computing device indicated in FIG. 3. In another aspect, the target time can be set on microbial reduction device 112. The target time can be manually set by an operator and/or the target temperature can be automatically set, via computer instructions, in response to a schedule, event and/or in response to a determined variable. In still other aspects, the computing device receives the target moisture content for the milled product stream and then calculates a corresponding time.

Operational flow 200 continues to operation 210, where the processing line is activated. In other aspects, the processing line can be activated prior to operation 204. Activation of the line instantiates any systems within the line. Operational flow 200 then continues to operation 212 where the milled product stream is received in the production line. As indicated in FIG. 1, the production line can include receiving the milled product stream in a clean room and/or receiving the milled product stream in a closed network of sanitary duct that receives sanitized force air to convey the milled product stream through the duct network.

From operation 212, operational flow 200 continues to operation 216 where moisture control operations are performed. A moisture control device can be located in-line with the conveyance network. In other aspects, moisture control operations can occur at the mill. Moisture control operations can include a computing device receiving an indication of a current moisture content of the milled product stream from a moisture sensor. The current moisture content of the milled product stream can be compared to the target moisture content set in operation 204. The moisture comparison can indicate a moisture differential between the current moisture content and the target moisture content. From the differential, a moisture addition/reduction amount (flow rate) can be determined. In one aspect, the computer device actuates a moisture control nozzle to treat the milled product stream to achieve the target moisture content.

In the situation where a declumping device is in the production line, operational flow 200 can continue to decision operation 218. An in-line declumping device can be located in-line with the conveyance network that conveys the milled product stream. At decision operation 218, it is decided whether to declump the milled product stream as indicated above in FIG. 1. When declumping is desired, the milled product stream can be conveyed through the conveyance network to the declumping device where a declumping process occurs. Operational flow 200 then continues to operation 220. When declumping is not desired, operational flow 200 also continues to operation 220.

Operational flow 200 continues to operation 220 where the milled product stream undergoes microbial reduction treatment. The milled product stream can be conveyed to a microbial reduction device via the network of sanitary duct. The microbial reduction device can be as indicated above in the text of FIG. 1. The set target temperature and set target time can be identified from the operation 204 and 206, respectively. The milled product stream can then be conveyed through the microbial reduction device to treat the milled product stream. The attributes of the milled product stream are more fully set forth above in FIG. 1.

FIG. 2 indicates a process flow from operation 220 to decision operation 222. However, in other aspects of the disclosure, operation 220 can flow to other operations prior to decision operation 222. For example, instruments downstream and/or associated with the microbial reduction device, can detect one or more conditions of the milled product stream. In other aspects, an operator may detect one or more conditions associated with the milled product stream. A decision can be made that one or more of the conditions are not appropriate. In such a situation, operational flow 200 can continue to a set of decision operations as described in operations 234-242 indicated below. Operational flow 200 can then loop back to operation 212 to process the downstream milled product according to any adjustments to the target moisture, target temperature and/or target time. Stated another way, adjustments can be made "on-the-fly" as the stream is being processed.

In the situation where a declumping device is in the production line, operational flow 200 can continue to decision operation 222. An in-line declumping device can be located in-line with the conveyance network that conveys the milled product stream. At decision operation 222, it is decided whether to declump the milled product stream as indicated above in text associated with FIG. 1. When declumping is desired, the milled product stream can be conveyed through the conveyance network to the declumping device where a declumping process occurs. Operational flow 200 then continues to operation 224. When declumping is not desired, operational flow 200 also continues to operation 224.

Operation 224 can occur before decision operation 222 or after decision operation 222. At operation 224, the milled product stream is cooled. In one aspect, a chilling unit is in-line with the conveyance network that conveys the milled product stream. The chilled air cools the milled product stream to about ambient temperatures as it is being conveyed through the conveyance network in order to minimize condensation formation.

Optionally, operational flow 200 continues to decision operation 226 where it is decided whether to sift the milled product stream. When it is decided to sift the milled product stream, the product stream can be conveyed to a sifting device via the conveyance network. Operational flow 200 then continues to operation 228. When it is decided not to sift the milled product stream, operational flow 200 also continues to operation 228.

At operation 228, the milled product stream can, optionally, be conveyed to a holding vessel where the milled product stream is held under sanitary conditions. Operational flow 200 then continues to operation 230 where load-out occurs. In other aspects, operational flow can continue from decision operation 226, directly to operation 230. Load-out can occur in various forms. For example, as indicated above in the text associated with FIG. 1, the milled product can be conveyed to a consumer packaging operation, a bulk packaging operation, a bulk transportation operation and/or a secondary production operation.

Operational flow 200 can continue to decision operation 232 where it is decided whether to deactivate the line. Even though decision operation 232 is indicated after operation 230, decision operation 232 can occur anywhere in operational flow 200. For example, the line can be deactivated for an emergency at any time or to correct a functional or quality issue with the line. Yet, one time to deactivate the line can be when the milled product stream is through the duct and a cycle has ended. The determination of whether to deactivate the line can occur through operator intervention, and/or via a signal from the computer. The deactivation of the line can be in response to a predetermined event and/or a schedule associated with a computing device. When it is decided not to deactivate the line, operational flow 200 loops back to operation 212, where the milled product stream is further continuously received. When it is decided to deactivate the line, operational flow 200 continues to decision operation 234.

From decision operation 232, operational flow 200 can continue to a set of decision operations 234-246. Even though FIG. 2 indicates such decision operations occurring in an order, the decision operations 234-246 can be in any order. Furthermore, decision operations 234-242 can occur "on-the-fly" while the system is active. At decision operation 234, it is decided whether to adjust the target moisture of the milled product stream. Again, the decision to adjust the target moisture content of the milled product stream can occur through manual input from a facility operator. The decision to adjust the target moisture content of the milled product stream can also be automatic, via a computing system, in response to a received value, in response to a determined variable, and/or in response to a changed condition on the line. In the situation where it is determined to adjust the target moisture content of the milled product stream, operational flow 200 continues to operation 236 where a new target moisture content is set in a manner similar to that described in operation 204. From operation 236, operational flow 200 continues to decision operation 238. Also in the situation where it is decided not to adjust the target moisture of the milled product stream, operational flow 200 also continues to decision operation 238.

At decision operation 238, it is decided whether to adjust the target temperature of the milled product stream. Again, the decision to adjust the target temperature of the milled product stream can occur through manual input from a facility operator. The decision to adjust the target temperature of the milled product stream can also be automatic, via a computing system, in response to a received value, in response to a determined variable, and/or in response to a changed condition on the line. In the situation where it is determined to adjust the target temperature of the milled product stream, operational flow 200 continues to operation 240 where a new target temperature is set in a manner similar to that described in operation 206. From operation 240, operational flow 200 continues to decision operation 242. Also in the situation where it is decided not to adjust the target moisture of the milled product stream, operational flow 200 also continues to decision operation 242.

At decision operation 242, it is decided whether to adjust the target residence time of the milled product stream in the microbial reduction treatment. Again, the decision to adjust the target time of the milled product stream can occur through manual input from a facility operator. The decision to adjust the target time of the milled product stream can also be automatic, via a computing system, in response to a received value, in response to a determined variable, and/or in response to a changed condition on the line. In the situation where it is determined to adjust the target time of the milled product stream, operational flow 200 continues to operation 244 where a new target time is set in a manner similar to that described in operation 208. From operation 244, operational flow 200 continues to decision operation 246. Also in the situation where it is decided not to adjust the target time of the milled product stream, operational flow 200 also continues to decision operation 246.

At decision operation 246, it is decided whether to facilitate a sanitary break in the line. The decision to facilitate a sanitary break in the line can occur through manual input from a facility operator. The decision to facilitate a sanitary break in the line can also be automatic, via a computing system, in response to a received value, in response to a determine variable, and/or in response to a changed condition on the line. When it is decided not to facilitate a sanitary break, operational flow 200 can loop back to operation 210 where the line is activated. When it is decided to facilitate a sanitary break, operational flow 200 can continue to operation 248. At operation 248, the lines of the system can be cleared. In one aspect, the duct network can be cleared of any remaining milled product by forcing air through the system or by manual cleaning.

Operational flow 200 continues to operation 250 where the lines or duct can be heated. As indicated above, the lines or duct can be heated via forced air. In other aspects, the duct can include heating coils that are activated to heat the duct and sanitize the system. From operation 250, operational flow 200 loops back to operation 210 where the line is activated.

C. Product

As further indicated herein, a sterile milled product is further disclosed. As stated above, the sterile milled product can include for example, flour of all types, bran, germ, grains, oats, wheat, rye, barley and the like. It is further contemplated that milled products that utilize the processes herein can include various ingredient types, sugars, spices and such. It is also contemplated that milled products that utilize the processes herein can include products that are first dehydrated and then milled or ground such as peppers, vegetables, fruits and the like.

The sterile milled products can be packaged for consumer use. For example, the milled product can be packaged in consumer quantities such as 1 pound to 20 pound bags or the like. In other aspects, the milled product is not packaged. For example, system 100 described above can include a conduit or conveyance network to provide a flow channel for a product stream to a secondary processing or food manufacturing facility. In still other aspects, the milled product can be transported in bulk. For example, the product stream can be conveyed into a freight shipping container or vessel.

In one aspect, a sterile milled product can be a milled product that includes no detectable traces of active microorganisms. In another aspect, a sterile milled product can be a milled product that includes no detectable traces of active microorganisms above a threshold set by a government body such as, for example, the United States Food and Drug Administration (or another country's governing body). The confidence level of the sterility can be about 50% to about 99.99%. The confidence level of the sterility can be about 50%, 55%, 60%, 65%, 70%, 75%, 80%, 85%, 90%, 95%, 96%, 97%, 98%, 99%, 99.1%, 99.2%, 99.3%, 99.4%, 99.41%, 99.42%, 99.43%, 99.44%, 99.45%, 99.46%, 99.47%, 99.48%, 99.49%, 99.50%, 99.51%, 99.52%, 99.53%, 99.54%, 99.55%, 99.56%, 99.57%, 99.58%, 99.59%, 99.60%, 99.61%, 99.62%, 99.63%, 99.64%, 99.65%, 99.66%, 99.67%, 99.68%, 99.69%, 99.70%, 99.71%, 99.72%, 99.73%, 99.74%, 99.75%, 99.76%, 99.77%, 99.78%, 99.79%, 99.80%, 99.81%, 99.82%, 99.83%, 99.84%, 99.85%, 99.86%, 99.87%, 99.88%, 99.89%, 99.90%, 99.91%, 99.92%, 99.93%, 99.94%, 99.95%, 99.96%, 99.97%, 99.98%, 99.99%, 100% to about 50%, 55%, 60%, 65%, 70%, 75%, 80%, 85%, 90%, 95%, 96%, 97%, 98%, 99%, 99.1%, 99.2%, 99.3%, 99.4%, 99.41%, 99.42%, 99.43%, 99.44%, 99.45%, 99.46%, 99.47%, 99.48%, 99.49%, 99.50%, 99.51%, 99.52%, 99.53%, 99.54%, 99.55%, 99.56%, 99.57%, 99.58%, 99.59%, 99.60%, 99.61%, 99.62%, 99.63%, 99.64%, 99.65%, 99.66%, 99.67%, 99.68%, 99.69%, 99.70%, 99.71%, 99.72%, 99.73%, 99.74%, 99.75%, 99.76%, 99.77%, 99.78%, 99.79%, 99.80%, 99.81%, 99.82%, 99.83%, 99.84%, 99.85%, 99.86%, 99.87%, 99.88%, 99.89%, 99.90%, 99.91%, 99.92%, 99.93%, 99.94%, 99.95%, 99.96%, 99.97%, 99.98%, 99.99%, 100%. The confidence level of the sterility can be greater than 99.6%.

The percentage of denaturation of the sterile milled product can be about 1% to about 10%. The percentage of denaturation of the sterile milled product can be about 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10% to about 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10%. In other aspects, the percentage of denaturation can be greater than about 10%. In still other aspects, the percentage of denaturation can be less than about 5%.

The moisture content of the sterile milled product can be from about 12% to about 16%. In other aspects, the moisture content of the sterile milled product can be from about 12.5% to about 14.5%. In still other aspects, the moisture content of the sterile milled product can be about 13.5%. The moisture content of the sterile milled product can be about 4%, 5%, 6%, 7%, 8%, 9%, 10%, 11%, 12%, 13%, 14%, 15%, 16%, 17%, 18%, 19%, 20% to about 4%, 5%, 6%, 7%, 8%, 9%, 10%, 11%, 12%, 13%, 14%, 15%, 16%, 17%, 18%, 19%, and 20%.

The water activity of the sterile milled product can be about 0.01, 0.05, 0.10, 0.15, 0.20, 0.25, 0.30, 0.35, 0.40, 0.45, 0.50, 0.55, 0.60 to about 0.01, 0.05, 0.10, 0.15, 0.20, 0.25, 0.30, 0.35, 0.40, 0.45, 0.50, 0.55, 0.60. The water activity of the sterile milled product can be below about 0.6.

The ash content of the sterile milled product can be about 0.30%, 0.35%, 0.40%, 0.45%, 0.50%, 0.55%, 0.60%, 0.65%, 0.70% to about 0.30%, 0.35%, 0.40%, 0.45%, 0.50%, 0.55%, 0.60%, 0.65%, 0.70%.

The viscosity of the sterile milled product can be measured by a falling number instrument by measuring the resistance of a flour and water paste to a falling stirrer. The falling number analysis can give an indication of the amount of alpha amylase activity in the sterile milled product. The viscosity value associated with the falling number instrument can be about 200 seconds, 225 seconds, 250 seconds, 275 seconds, 300 seconds, 325 seconds, 350 seconds, 375 seconds, 400 seconds, 425 seconds, 450 seconds, 475 seconds, 500 seconds to about 200 seconds, 225 seconds, 250 seconds, 275 seconds, 300 seconds, 325 seconds, 350 seconds, 375 seconds, 400 seconds, 425 seconds, 450 seconds, 475 seconds, 500 seconds.

A Farinograph determines dough and gluten properties of a sterile milled product sample by measuring the resistance of a dough from the sterile milled product and water. The Farinograph can indicate an absorption range of about 50 minutes, 51 minutes, 52 minutes, 53 minutes, 54 minutes, 55 minutes, 56 minutes, 57 minutes, 58 minutes, 59 minutes, 60 minutes, 61 minutes, 62 minutes, 63 minutes, 64 minutes, 65 minutes, 66 minutes, 67 minutes, 68 minutes, 69 minutes, 70 minutes to about 50 minutes, 51 minutes, 52 minutes, 53 minutes, 54 minutes, 55 minutes, 56 minutes, 57 minutes, 58 minutes, 59 minutes, 60 minutes, 61 minutes, 62 minutes, 63 minutes, 64 minutes, 65 minutes, 66 minutes, 67 minutes, 68 minutes, 69 minutes, 70 minutes.

The Farinograph can indicate a peak time range of about 1.0 minutes, 1.5 minutes, 2.0 minutes, 2.5 minutes, 3.0 minutes, 3.5 minutes, 4.0 minutes, 4.5 minutes, 5.0 minutes, 5.5 minutes, 6.0 minutes, 6.5 minutes, 7.0 minutes, 7.5 minutes, 8.0 minutes, 8.5 minutes, 9.0 minutes, 9.5 minutes, 10.0 minutes, 10.5 minutes, 11.0 minutes, 11.5 minutes, 12.0 minutes, 12.5 minutes, 13.0 minutes, 13.5 minutes, 14.0 minutes, 14.5 minutes, 15.0 minutes, 15.5 minutes, 16.0 minutes, 16.5 minutes, 17.0 minutes, 17.5 minutes, 18.0 minutes, 18.5 minutes, 19.0 minutes, 19.5 minutes, 20.0 minutes to about 1.0 minutes, 1.5 minutes, 2.0 minutes, 2.5 minutes, 3.0 minutes, 3.5 minutes, 4.0 minutes, 4.5 minutes, 5.0 minutes, 5.5 minutes, 6.0 minutes, 6.5 minutes, 7.0 minutes, 7.5 minutes, 8.0 minutes, 8.5 minutes, 9.0 minutes, 9.5 minutes, 10.0 minutes, 10.5 minutes, 11.0 minutes, 11.5 minutes, 12.0 minutes, 12.5 minutes, 13.0 minutes, 13.5 minutes, 14.0 minutes, 14.5 minutes, 15.0 minutes, 15.5 minutes, 16.0 minutes, 16.5 minutes, 17.0 minutes, 17.5 minutes, 18.0 minutes, 18.5 minutes, 19.0 minutes, 19.5 minutes, 20.0 minutes.

The Farinograph can indicate a mechanical tolerance index range of about 5 BU, 10 BU, 15 BU, 20 BU, 25 BU, 30 BU, 35 BU, 40 BU, 45 BU, 50 BU, 55 BU, 60 BU, 65 BU, 70 BU, 75 BU, 80 BU, 85 BU, 90 BU, 95 BU, 100 BU, 105 BU, 110 BU, 115 BU, 120 BU to about 5 BU, 10 BU, 15 BU, 20 BU, 25 BU, 30 BU, 35 BU, 40 BU, 45 BU, 50 BU, 55 BU, 60 BU, 65 BU, 70 BU, 75 BU, 80 BU, 85 BU, 90 BU, 95 BU, 100 BU, 105 BU, 110 BU, 115 BU, 120 BU.

The Farinograph can indicate a stability range of about 1 minute, 2 minutes, 3 minutes, 4 minutes, 5 minutes, 6 minutes, 7 minutes, 8 minutes, 9 minutes, 10 minutes, 11 minutes, 12 minutes, 13 minutes, 14 minutes, 15 minutes, 16 minutes, 17 minutes, 18 minutes, 19 minutes, 20 minutes, 21 minutes, 22 minutes, 23 minutes, 24 minutes, 25 minutes 26 minutes, 27 minutes, 28 minutes, 29 minutes, 30 minutes to about 1 minute, 2 minutes, 3 minutes, 4 minutes, 5 minutes, 6 minutes, 7 minutes, 8 minutes, 9 minutes, 10 minutes, 11 minutes, 12 minutes, 13 minutes, 14 minutes, 15 minutes, 16 minutes, 17 minutes, 18 minutes, 19 minutes, 20 minutes, 21 minutes, 22 minutes, 23 minutes, 24 minutes, 25 minutes 26 minutes, 27 minutes, 28 minutes, 29 minutes, 30 minutes.

A extensigraph determines the resistance and extensibility of a dough made from the sterile milled product. In one aspect the resistance and extensibility can be measured at about 5 minutes, 10 minutes, 15 minutes, 20 minutes, 25 minutes, 30 minutes, 35 minutes, 40 minutes, 45 minutes, 50 minutes, 55 minutes, 60 minutes, 65 minutes, 70 minutes, 75 minutes, 80 minutes, 85 minutes, 90 minutes, 95 minutes, 100 minutes, 105 minutes, 110 minutes, 115 minutes, 120 minutes, 125 minutes, 130 minutes, 135 minutes, 140 minutes, 145 minutes, and 150 minutes. The dough made from the sterile milled product can have a resistance of about 20 BU, 40 BU, 60 BU, 80 BU, 100 BU, 120 BU, 140 BU, 160 BU, 180 BU, 200 BU, 220 BU, 240 BU, 260 BU, 280 BU, 300 BU, 320 BU, 340 BU, 360 BU, 380 BU, 400 BU, 420 BU, 440 BU, 460 BU, 480 BU, 500 BU, 520 BU, 540 BU, 560 BU, 580 BU, 600 BU, 620 BU, 640 BU, 660 BU, 680 BU, 700 BU, 720 BU, 740 BU, 760 BU, 780 BU, 800 BU, 820 BU, 840 BU, 860 BU, 880 BU, 900 BU, 920 BU, 940 BU, 960 BU, 980 BU, 1000 BU to about 20 BU, 40 BU, 60 BU, 80 BU, 100 BU, 120 BU, 140 BU, 160 BU, 180 BU, 200 BU, 220 BU, 240 BU, 260 BU, 280 BU, 300 BU, 320 BU, 340 BU, 360 BU, 380 BU, 400 BU, 420 BU, 440 BU, 460 BU, 480 BU, 500 BU, 520 BU, 540 BU, 560 BU, 580 BU, 600 BU, 620 BU, 640 BU, 660 BU, 680 BU, 700 BU, 720 BU, 740 BU, 760 BU, 780 BU, 800 BU, 820 BU, 840 BU, 860 BU, 880 BU, 900 BU, 920 BU, 940 BU, 960 BU, 980 BU, 1000 BU. The dough made from the sterile milled product can have a resistance greater than 1000 BU.

The extensigraph can indicate an extensibility of about 0 cm, 5 cm, 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm to about 0 cm, 5 cm, 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm.

A Glutomatic is used to determine the amount and quality of gluten in a sterile milled product sample. The Glutomatic can indicate a wet gluten range of about 10%, 11%, 12%, 13%, 14%, 15%, 16%, 17%, 18%, 19%, 20%, 21%, 22%, 23%, 24%, 25%, 26%, 27%, 28%, 29%, 30% to about 10%, 11%, 12%, 13%, 14%, 15%, 16%, 17%, 18%, 19%, 20%, 21%, 22%, 23%, 24%, 25%, 26%, 27%, 28%, 29%, 30%.

Solvent retention capacity is a test used to measure the capacity of a sterile milled product to hold different solvents. Generally, lactic acid is associated with gluten protein characteristics. Sodium carbonate is associated to levels of damaged starch. Sucrose is related to pentose components. Water solvent retention capacity is influenced by all water absorbing compounds of the sterile milled product. The combination pattern can indicate sterile milled product quality and functionality profile.

The solvent retention test can indicate a water solvent retention capacity range of about 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90% to about 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%.

The solvent retention test can indicate a lactic acid solvent retention range of about 40%, 45%, 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180% to about 40%, 45%, 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180%.

The solvent retention test can indicate a sodium carbonate range of about 40%, 45%, 50%, 55%, 60%, 65%, 70%, 75%, 80%, 85%, 90%, 95%, 100%, to about 40%, 45%, 50%, 55%, 60%, 65%, 70%, 75%, 80%, 85%, 90%, 95%, 100%.

The solvent retention test can indicate a sucrose solvent retention range of about 50%, 55%, 60%, 65%, 70%, 75%, 80%, 85%, 90%, 95%, 100%, 105%, 110%, 115%, 120%, 125%, 130%, to about 50%, 55%, 60%, 65%, 70%, 75%, 80%, 85%, 90%, 95%, 100%, 105%, 110%, 115%, 120%, 125%, 130%.

A Rapid Visco Analyzer test measures sterile milled product starch properties. The Rapid Visco Analyzer indicates starch viscosity by measuring the resistance of a sterile milled product and water slurry during heating and cooling.

The Rapid Visco Analyzer can indicate a peak viscosity range of about 0 RVU, 25 RVU, 50 RVU, 75 RVU, 100 RVU, 125 RVU, 150 RVU, 175 RVU, 200 RVU, 225 RVU, 250 RVU, 275 RVU, 300 RVU, 325 RVU, 350 RVU, 375 RVU, 400 RVU, 425 RVU, 450 RVU, 475 RVU, 500 RVU, 525 RVU, 550 RVU, 575 RVU, 600 RVU, 625 RVU, 650 RVU, 675 RVU, 700 RVU, 725 RVU, 750 RVU, 775 RVU, 800 RVU to about 0 RVU, 25 RVU, 50 RVU, 75 RVU, 100 RVU, 125 RVU, 150 RVU, 175 RVU, 200 RVU, 225 RVU, 250 RVU, 275 RVU, 300 RVU, 325 RVU, 350 RVU, 375 RVU, 400 RVU, 425 RVU, 450 RVU, 475 RVU, 500 RVU, 525 RVU, 550 RVU, 575 RVU, 600 RVU, 625 RVU, 650 RVU, 675 RVU, 700 RVU, 725 RVU, 750 RVU, 775 RVU, 800 RVU.

The Rapid Visco Analyzer can indicate a final viscosity range of about 0 RVU, 25 RVU, 50 RVU, 75 RVU, 100 RVU, 125 RVU, 150 RVU, 175 RVU, 200 RVU, 225 RVU, 250 RVU, 275 RVU, 300 RVU, 325 RVU, 350 RVU, 375 RVU, 400 RVU, 425 RVU, 450 RVU, 475 RVU, 500 RVU, 525 RVU, 550 RVU, 575 RVU, 600 RVU, 625 RVU, 650 RVU, 675 RVU, 700 RVU, 725 RVU, 750 RVU, 775 RVU, 800 RVU, 825 RVU, 850 RVU, 875 RVU, 900 RVU, 925 RVU, 950 RVU, 975 RVU, 1000 RVU to about 0 RVU, 25 RVU, 50 RVU, 75 RVU, 100 RVU, 125 RVU, 150 RVU, 175 RVU, 200 RVU, 225 RVU, 250 RVU, 275 RVU, 300 RVU, 325 RVU, 350 RVU, 375 RVU, 400 RVU, 425 RVU, 450 RVU, 475 RVU, 500 RVU, 525 RVU, 550 RVU, 575 RVU, 600 RVU, 625 RVU, 650 RVU, 675 RVU, 700 RVU, 725 RVU, 750 RVU, 775 RVU, 800 RVU, 825 RVU, 850 RVU, 875 RVU, 900 RVU, 925 RVU, 950 RVU, 975 RVU, 1000 RVU One or more of the above characteristics of the sterile milled product can be exhibited by the sterile milled product from the time period when the sterile milled product exits the microbial reduction device for a time period thereafter of 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, 60 days, 61 days, 62 days, 63 days, 64 days, 65 days, 66 days, 67 days, 68 days, 69 days, 70 days, 71 days, 72 days, 73 days, 74 days, 75 days, 76 days, 77 days, 78 days, 79 days, 80 days, 81 days, 82 days, 83 days, 84 days, 85 days, 86 days, 87 days, 88 days, 89 days, 90 days, 95 days, 100 days, 105 days, 110 days, 115 days, 120 days, 125 days, 130 days, 135 days, 140 days, 145 days, 150 days, 155 days, 160 days, 165 days, 170 days, 175 days, 180 days, 185 days, 190 days, 195 days, 200 days, 210 days, 220 days, 230 days, 240 days, 250 days, 260 days, 270 days, 280 days, 290 days, 300 days, 310 days, 320 days, 330 days, 340 days, 350 days, 360 days to about 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, 60 days, 61 days, 62 days, 63 days, 64 days, 65 days, 66 days, 67 days, 68 days, 69 days, 70 days, 71 days, 72 days, 73 days, 74 days, 75 days, 76 days, 77 days, 78 days, 79 days, 80 days, 81 days, 82 days, 83 days, 84 days, 85 days, 86 days, 87 days, 88 days, 89 days, 90 days, 95 days, 100 days, 105 days, 110 days, 115 days, 120 days, 125 days, 130 days, 135 days, 140 days, 145 days, 150 days, 155 days, 160 days, 165 days, 170 days, 175 days, 180 days, 185 days, 190 days, 195 days, 200 days, 210 days, 220 days, 230 days, 240 days, 250 days, 260 days, 270 days, 280 days, 290 days, 300 days, 310 days, 320 days, 330 days, 340 days, 350 days, 360 days. One or more of the above characteristics of the sterile milled product can be exhibited by the sterile milled product from the time period when the sterile milled product exits the microbial reduction device for a time period thereafter of greater than 360 days.

D. Exemplary Computing System

FIG. 3 is an exemplary computing system that can be utilized in various management aspects for microbial reduction in a processing stream of a milled product. Referring to FIG. 3, an exemplary system includes a computing device, such as computing device 300. In a basic configuration, computing device 300 typically includes at least one processing unit 302 and system memory 304. Depending on the exact configuration and type of computing device, system memory 304 can be volatile (such as RAM), non-volatile (such as ROM, flash memory and the like) or some combination of the two. System memory 304 typically includes operating system 305, one or more applications 306, and can include program data 307. In one aspect, applications 306 further include application 320 for milled product processing stream management. This basic configuration is illustrated in FIG. 3 by those components within dashed line 308.

Computing device 300 can also have additional features or functionality. For example, computing device 300 can also include additional data storage devices (removable and/or non-removable) such as, for example, magnetic disks, optical disks, or tape. Such additional storage is illustrated in FIG. 3 by computer readable storage medium 309 and non-removable storage 310. Computer readable storage medium can include volatile and non-volatile, removable and non-removable media implemented by, for example, stored computer readable instructions, stored data structures, stored program modules or other stored data. System memory 304, computer readable storage medium 309 and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information and which can be accessed by computing device 300. Any such computer storage media can be part of device 300. Computing device 300 can also have input device(s) 312 such as a keyboard, mouse, pen, voice input device, touch input device, etc. Output device(s) 314 such as a display, speakers, printer, etc., can also be included. All these devices are known in the art and need not be discussed at length here.

Computing device 300 also contains communication connection(s) 316 that allow the device to communicate with other computing devices 318, such as over a network or a wireless network. Communication connection(s) 316 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A process for microbial treatment of a milled product stream, the process comprising:

providing a flowable stream of a milled product, wherein the flowable stream of the milled product is preconditioned to have a generally uniform predetermined moisture content throughout the stream, wherein the generally uniform predetermined moisture content throughout the stream is from about 12% to about 16%, wherein the generally uniform predetermined moisture content deviates less than about 0.5% throughout the stream;

conveying the flowable stream of the milled product through a radio frequency (RF) microbial reduction device, wherein the flowable stream of the milled product is heated to a temperature from about 170° F. to about 210° F. as the flowable stream of the milled product is conveyed through the microbial reduction device; and after the flowable stream of the milled product is conveyed through the microbial reduction device, conveying the flowable stream of the milled product within a conveyance network having chilled air to cause a temperature reduction of the flowable stream of the milled product to about ambient temperature.

2. The process of claim 1, wherein the flowable stream of the milled product is at least one member of a group comprising: a flowable stream of a flour, a flowable stream of a germ, a flowable stream of a bran, a flowable stream of grain, a flowable stream of oats, a flowable stream of rye, a flowable stream of barley, a flowable stream of an ingredient, a flowable stream of a spice, a flowable stream of a sugar, a flowable stream of a milled dehydrated vegetable, a flowable stream of a milled dehydrated fruit, and a flowable stream of a milled dehydrated pepper.

3. The process of claim 1, wherein the flowable stream of milled product is preconditioned to have a generally uniform predetermined moisture content from about 12.5% moisture to about 14.5% moisture throughout the stream, wherein the generally uniform predetermined moisture content deviates less than about 0.2% throughout the stream.

4. The process of claim 1, wherein the radio frequency device is configured to generate a frequency at about 40 MHz.

5. The process of claim 1, wherein the flowable stream of the milled product is heated by the RF microbial reduction device to a temperature from about 180° F. to about 200° F.

6. The process of claim 1, wherein the conveyance network is a network of duct.

7. The process of claim 6, wherein the network of duct is a closed sanitary network of duct.

8. The process of claim 7, wherein the closed sanitary network of duct is in communication with a heating element to cause a temperature increase of the closed sanitary network of duct.

9. The process of claim 8, wherein the heating element is at least one member of a group comprising, a heating coil and an air heater.

10. A process for microbial treatment of a milled product stream, the process comprising:
providing a flowable stream of a milled product, wherein the flowable stream of the milled product is precondition to have a generally uniform predetermined moisture content throughout the stream;
transporting the flowable stream of the milled product through a radio frequency (RF) microbial reduction device, wherein the flowable stream of the milled product is heated to a temperature from about 150° F. to about 240° F. while flowing through the RF microbial reduction device; and
after the flowable stream of the milled product is conveyed through the RF microbial reduction device, conveying the flowable stream of the milled product within a closed sanitary conveyance network to cause a temperature reduction of the flowable stream of the milled product.

11. The process of claim 10, wherein the flowable stream of the milled product is at least one member of a group comprising: a flowable stream of a flour, a flowable stream of a germ, a flowable stream of a bran, a flowable stream of grain, a flowable stream of oats, a flowable stream of rye, a flowable stream of barley, a flowable stream of an ingredient, a flowable stream of a spice, a flowable stream of a sugar, a flowable stream of a milled dehydrated vegetable, a flowable stream of a milled dehydrated fruit, and a flowable stream of a milled dehydrated pepper.

12. The process of claim 10, wherein the RF microbial reduction device is configured to generate an RF frequency from about 20 MHz to about 2450 MHz.

13. The process of claim 10, wherein less than 10% of the flowable steam is denatured when the flowable stream of milled product is transported through a radio frequency (RF) microbial reduction device.

14. The process of claim 10, wherein the closed sanitary conveyance network is a network of duct and the flowable stream of milled product is transported in the closed sanitary network of duct via chilled sanitary forced air.

15. The process of claim 14, further comprising terminating the transport at a load-out device.

16. The process of claim 15, wherein the load-out device is at least one member of a group comprising: a consumer bagging device, a bulk bagging device, a bulk transportation vehicle, and a food processing device.

17. A process for microbial treatment of a milled grain product stream, the process comprising:
receiving a flowable stream of a milled grain product;
transporting the flowable stream of milled grain product to a moisture control device, wherein the moisture control device preconditions the flowable stream of milled grain product to have a generally uniform predetermined moisture content from about 12.5% to about 14.5% as the flowable stream of milled grain product passes through the moisture control device, wherein the generally uniform predetermined moisture content deviates less than about 0.5% throughout the stream, wherein at least a portion of the flowable stream has a microbial activity level;
after the flowable stream of milled grain product passes through the moisture control device, transporting, by a conveyance network, the flowable stream of milled grain product to a radio frequency (RF) microbial reduction device in-line with the conveyance network, wherein the RF microbial reduction device heats the flowable stream of milled grain product to a temperature from about 180° F. to about 200° F. as the flowable stream of milled grain product is conveyed through the RF microbial reduction device to cause a reduction in the microbial activity level of at least 3.0 log CFU/g and to cause less than 10% denaturation; and
after the flowable stream of milled grain product is conveyed through the RF microbial reduction device, conveying the flowable stream of milled grain product within the conveyance network by chilled forced air to cause a temperature reduction of the flowable stream of milled grain product to about ambient temperature.

* * * * *